April 23, 1963

K. HEHL 3,086,244

INJECTION MOLDING MACHINE

Filed April 27, 1961

Inventor:
Karl Hehl
By: George U. Spencer
Attorney

April 23, 1963     K. HEHL     3,086,244

INJECTION MOLDING MACHINE

Filed April 27, 1961     8 Sheets-Sheet 3

Inventor:
Karl Hehl
By: George H. Spencer
Attorney

April 23, 1963 K. HEHL 3,086,244
INJECTION MOLDING MACHINE
Filed April 27, 1961 8 Sheets-Sheet 4

Fig.9

Inventor:
Karl Hehl
By: George U Spencer
Attorney

April 23, 1963     K. HEHL     3,086,244
INJECTION MOLDING MACHINE
Filed April 27, 1961     8 Sheets-Sheet 7

United States Patent Office 3,086,244
Patented Apr. 23, 1963

3,086,244
INJECTION MOLDING MACHINE
Karl Hehl, Lossburg, Wurttemberg, Germany, assignor to Arburg Feingeratefabrik oHG Hehl & Sohne, Lossburg, Wurttemberg, Germany
Filed Apr. 27, 1961, Ser. No. 105,998
Claims priority, application Germany July 23, 1960
12 Claims. (Cl. 18—30)

The present invention relates to injection molding machines.

More particularly, the present invention relates to an injection molding machine in which the mold clamping mechanism can be oriented either horizontally or vertically, as desired, and represents an improvement of the injection molding machine disclosed and claimed in my co-pending application Serial No. 51,886, filed August 25, 1960, now Patent No. 3,068,520.

It is a primary object of the present invention to provide a simple injection molding machine which can easily be manually adjusted to any one of many operating conditions without it being necessary to exchange the various machine components, so that the machine can always be placed into the most favorable position which will enable it to produce a work piece of a given shape and type.

According to the present invention, the above object is achieved by providing an injection molding machine in which the mold clamping mechanism as well as one or more axially adjustable injection casting assemblies, each having a dosing mechanism which is operative irrespective of the position of the particular injection casting assembly with which it is associated, are positively and releasably interconnected to form a structural entity which is steplessly rotatably mounted on the machine support and which is adapted to be held in place by friction. An injection mold machine according to the present invention is thus particularly suited for making exceptionally complicated, i.e., multiple-shaped and multiple-membered, composite work pieces having also complicated interior insets.

The invention may be carried further by providing two or three identical injection casting assemblies for purposes of making products composed of different materials or multi-colored products.

Additional objects and advantages of the present invention will become apparent upon consideration of the following description when taken in conjunction with the accompanying drawings in which.

Referring now to the drawings and FIGURES 1 to 10 thereof in particular, the same show an injection molding machine comprising an injection casting assembly which has an intermediate carrier member 1 which carries at one end a hydraulic or pneumatic cylinder 2 and at the other end a plasticizing cylinder 4 which is heated in conventional manner. A granulate storage receptacle 15, together with its dosing device, is also mounted on the member 1, which thus carries the various components that make up the injection casting assembly, the same being provided with two parallel bores through which extend two struts 5, 6, thereby making the member 1 axially adjustable, movement in axial direction being effected by two internally threaded worm wheels arranged on the struts 5, 6. Only the worm wheel 7 carried by the strut 6 is shown in the drawings. Two worms cooperate with the two worm wheels; here, too, only the worm 9 cooperating with the worm wheel 7 is illustrated. The two worms are mounted on an axle extending at right angles to the longitudinal axis of the injection molding assembly, this axle carrying a suitable hand crank (not shown) whereby the worms can be rotated, thus enabling the member 1 to be moved in axial direction.

The granulate receptacle 15 which holds the plastic granulate to be supplied to the plasticizing cylinder 4 is divided into two chambers I and II by means of a partition wall 18; two covers 19, 20, are provided for closing off the chambers I and II, respectively. If the injection casting assembly is to be operated predominantly in horizontal position, the granulate is stored in chamber I; if the assembly is to be operated predominantly in vertical position, the granulate is stored in chamber II.

Also shown is a dosing channel 16 which, irrespective of the position of the injection casting assembly, will be horizontal and at right angles to the longitudinal axis of the assembly.

Figure 11:
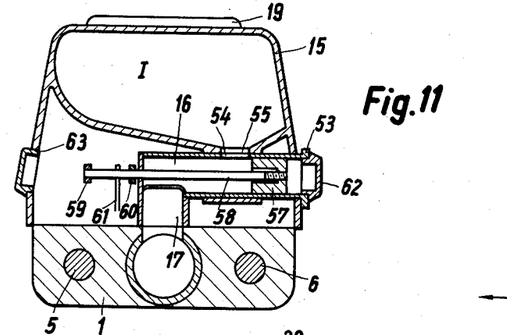
FIGURE 11 is a sectional view of the granulate storage receptacle and the dosing device, taken substantially on line 11—11 of FIGURE 13.
Figure 12:
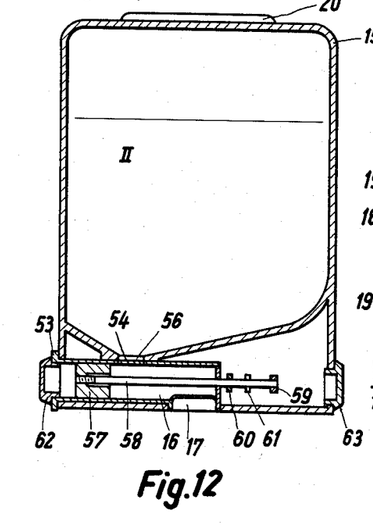
FIGURE 12 is a sectional view taken substantially on line 12—12 of FIGURE 13.
Figure 13:
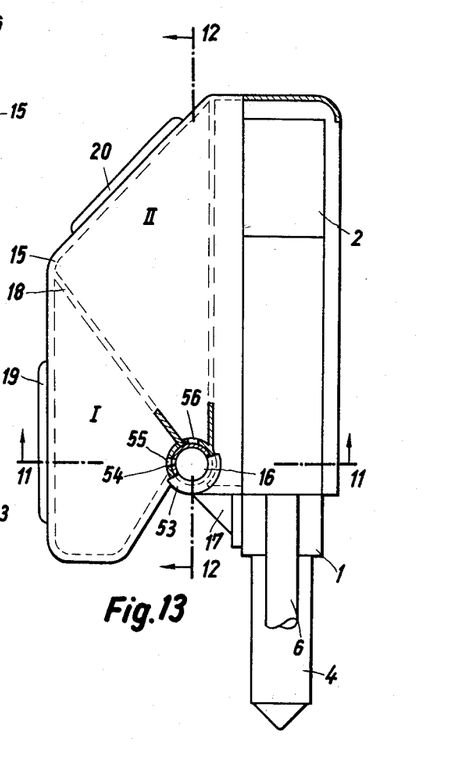
FIGURE 13 is a side view of the injection casting assembly.
Figures 14, 15, 16:
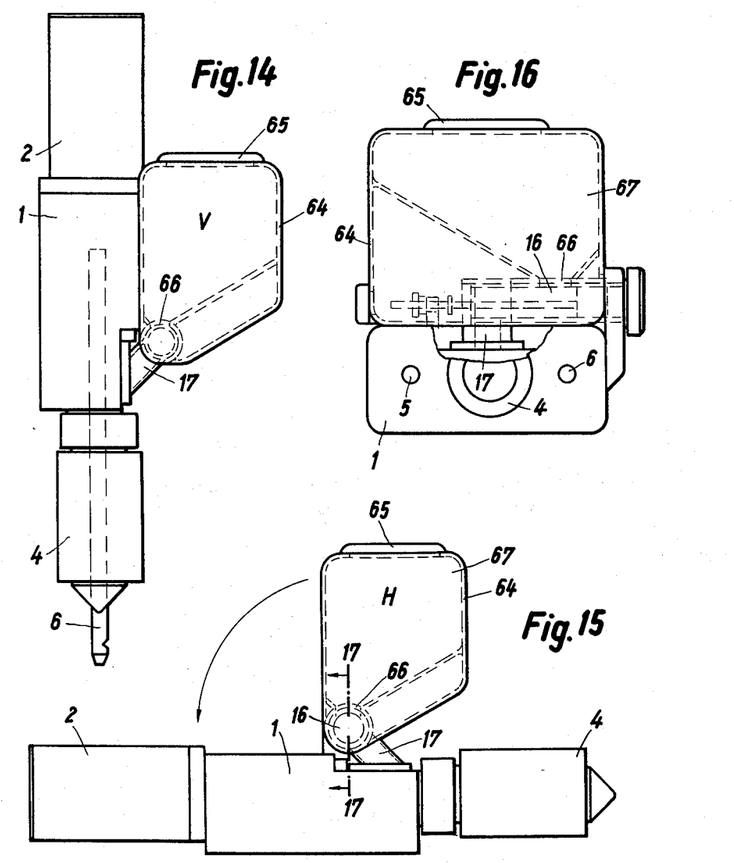
FIGURE 14 is a modified embodiment of a granulate storage receptacle, the same being pivotally mounted on the vertically oriented injection casting assembly and having but one granulate chamber.
FIGURE 15 shows the granulate storage receptacle of FIGURE 14 when occupying a vertical position while attached to a horizontally oriented injection casting assembly.
FIGURE 16 is a front view of the injection casting assembly of FIGURES 14 and 15.
Figure 17:
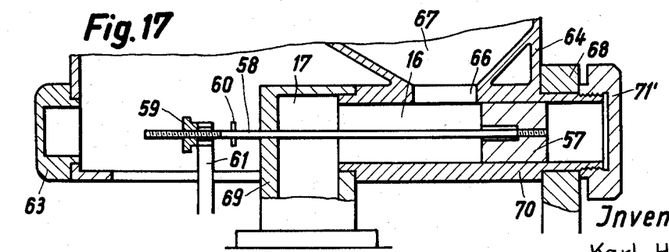
FIGURE 17 is a sectional view taken substantially on line 17—17 of FIGURE 15.

As best shown in FIGURES 11 to 13, a dosing piston 57 is slidably arranged within the channel 16. This piston 57 is connected to a piston actuating rod 58 carrying a fixed abutment 59 and an abutment 60 which is adjustable along the length of the rod 58. An actuating member 61, which is controlled by the movement of the injection piston of the assembly (not shown), engages the two abutments 59, 60, the extent to which the rod 58 is moved and consequently the stroke of the piston 57 being dependent on the distance between the two abutments, which may be varied by adjusting the position of abutment 60. In this way, the amount of granulate dosed by the dosing device may be adjusted at will.

The above-mentioned dosing channel 16 is formed by a dosing sleeve 53. The latter is rotatably mounted so that its inlet opening 54 can be aligned either with the outlet opening 55 of chamber I or outlet opening 56 of chamber II. In the position shown in FIGURE 11, it is the chamber I whose outlet opening 55 is in communication with the inlet opening 54 of the sleeve 53 constituting the dosing channel 16, whereas FIGURE 12 shows the outlet opening 56 of chamber II to be in communication with inlet opening 54. The communication between the dosing channel 16 and the plasticizing cylinder 4 is established by way of an outlet channel 17.

By virtue of the above arrangement, the relied on mechanism to actuate the dosing device will always be the same, regardless of the operative position of the injection casting assembly. Furthermore, since the actuation is effected by the injection piston, it is no longer necessary to devote the previously required amount of time to the change-over of the various parts whenever the operative position of the injection casting assembly is changed.

The mold clamping mechanism may be of the type described in my co-pending application Serial No. 818,337, filed June 5, 1959, and include two mounting struts 27, 28 carrying a stationary platen 29, an end plate 30, and a movable platen 31 cooperating with the stationary platen to clamp a mold therebetween. The end plate 30 carries a threaded bolt 33 held in place by two nuts 34, 35, there being a toggle lever linkage, indicated generally at 32, interposed between the inner end of the bolt 33 and the movable platen 31. This toggle lever linkage 32 is operated by a hydraulic cylinder and piston arrangement 32a which supplies the necessary clamping force.

The mold clamping mechanism as well as one or more injection casting assemblies forming part of the machine are positively and detachably connected with each other and form a structural work unit or entity which is rotatable with respect to the machine base 50, thereby making possible a stepless adjustment of the position. The work unit is held in place by friction. The rotatable bearing for this structural entity is constituted by the set bolts 36, 37, which are mounted in carrier elements 42, 43, of the base 50 of the injection molding machine. These bolts 36, 37, have double receiving elements 38, 39, mounted thereon, the ends of the last-mentioned elements being so arranged that additional rods can be received thereby and held in place by them.

The bolts 36, 37, as well as the elements 38, 39, are provided with a central transverse bore through which pass the struts 27, 28, of the mold clamping mechanism. If the bolts 36, 37 are not fixed in place in their bearings, namely, the carrier elements 42, 43, of the base 50, they are free to rotate together with the struts 27, 28, passing therethrough and the elements 38, 39, carried thereby. Upon such rotation, the mold clamping mechanism as well as the strut-mounted injection casting assembly anchored on the receiving elements carried by struts of the mold clamping mechanism, and any additional injection casting assemblies anchored in the ends of the double receiving elements 38, 39, will likewise rotate. The entire rotatable unit can be frictionally maintained in place in the carrier elements 42, 43, of the base 50. The structural components by means of which this is accomplished comprise a wedging disc 44, 45, tightening screws 46, 47, as well as a friction ring 40 for each carrier element. When the screws 46, 47 are tightened, the bolts 36, 37, are axially drawn in further into their carrier elements 42, 43, and are there held in place, so that the entire rotatable system is frictionally held in place in the base 50, thereby preventing rotation thereof.

Figure 1:
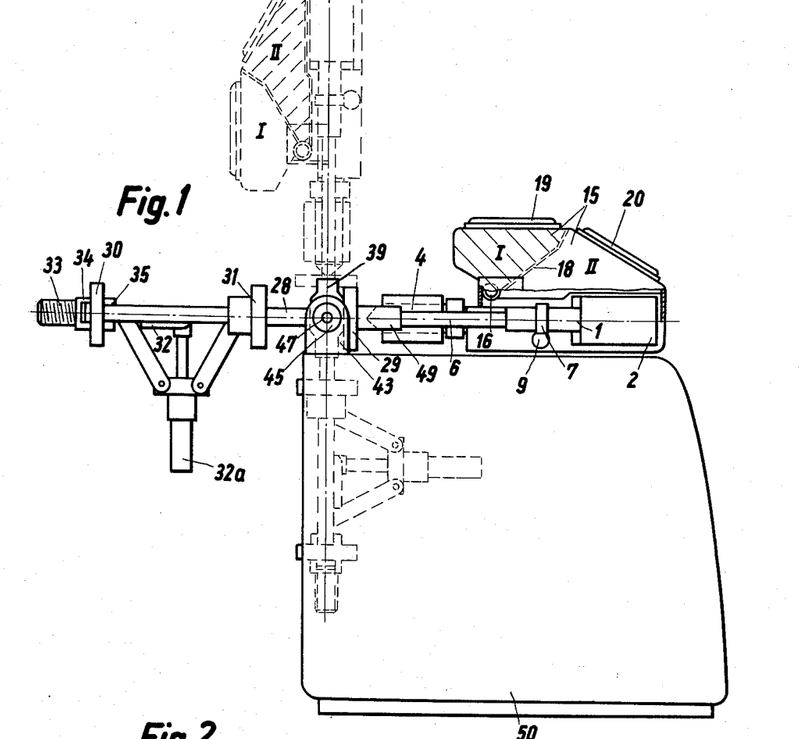
FIGURE 1 is a side elevational view of an injection mold machine according to the present invention, the mold clamping mechanism and the injection casting assembly being shown in solid lines when occupying a horizontal position and in dashed lines when occupying a vertical position.
Figure 2:
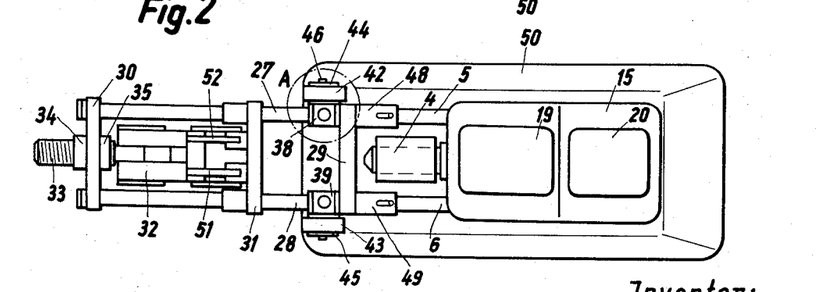
FIGURE 2 is a plan view of the injection mold machine shown in FIGURE 1.
Figure 3:
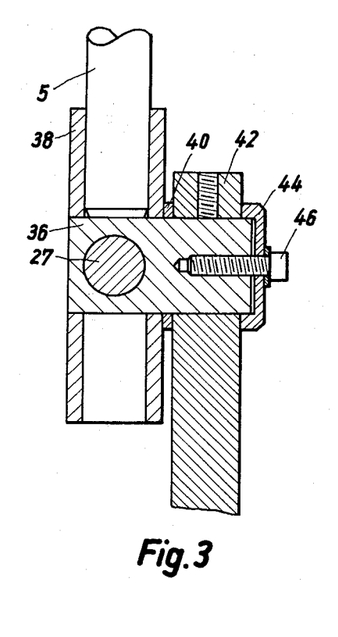
FIGURE 3 is a sectional view of a detail of FIGURE 1, located within the circle A.
Figure 4:
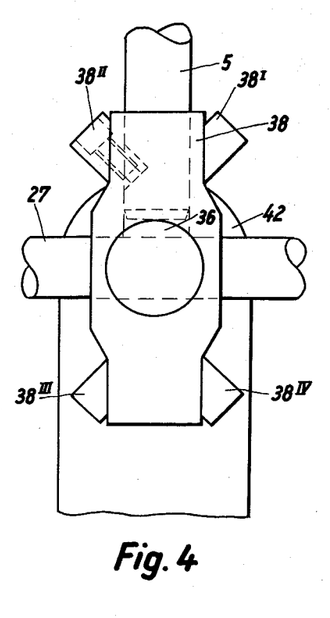
FIGURE 4 is a side view of the detail shown in FIGURE 3.
Figure 5:
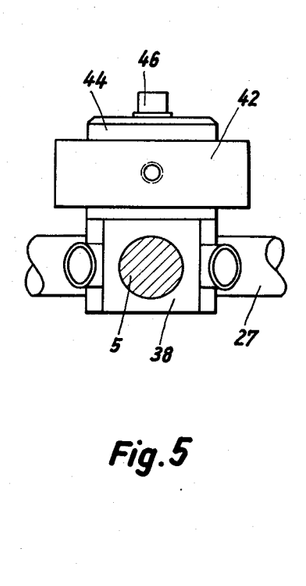
FIGURE 5 is a plan view of the detail shown in FIGURES 3 and 4.
Figures 6, 7, 8:
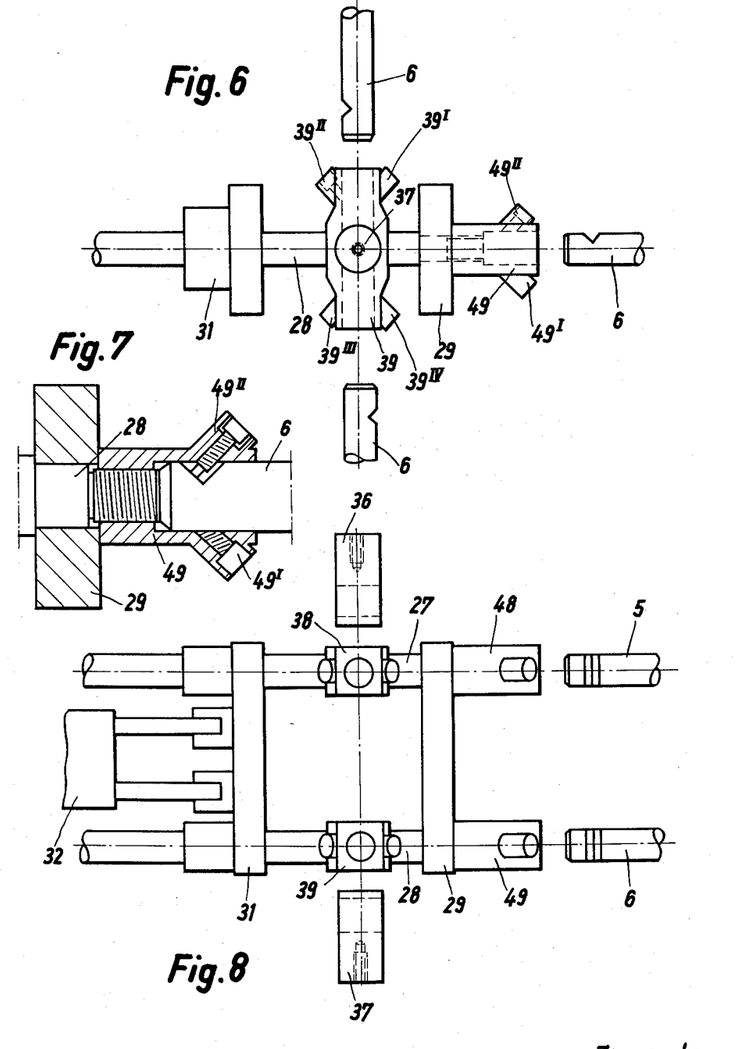
FIGURE 6 is a side elevational view of a detail of FIGURE 1, showing how the injection casting assemblies may variously be attached.
FIGURE 7 is a longitudinal sectional view of FIGURE 6.
FIGURE 8 is a plan view of the structure shown in FIGURE 6, the mounting bolts being shown in withdrawn position.
Figure 9:
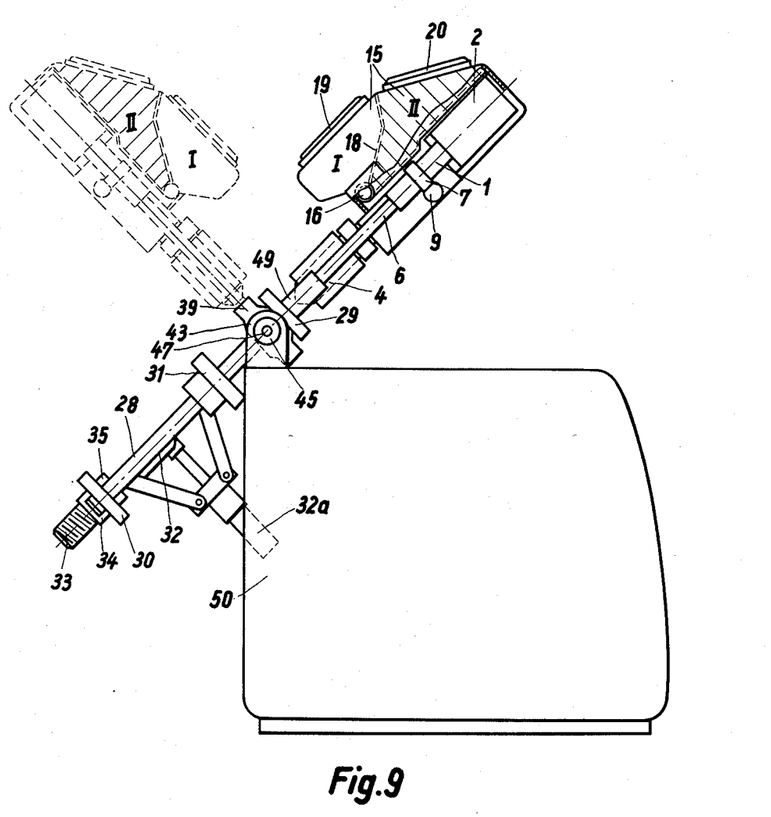
FIGURE 9 is a side elevational view showing, in solid and dashed lines, respectively, the inclined positions of an injection casting assembly when the mold clamping mechanism is in an inclined position.
Figure 10:
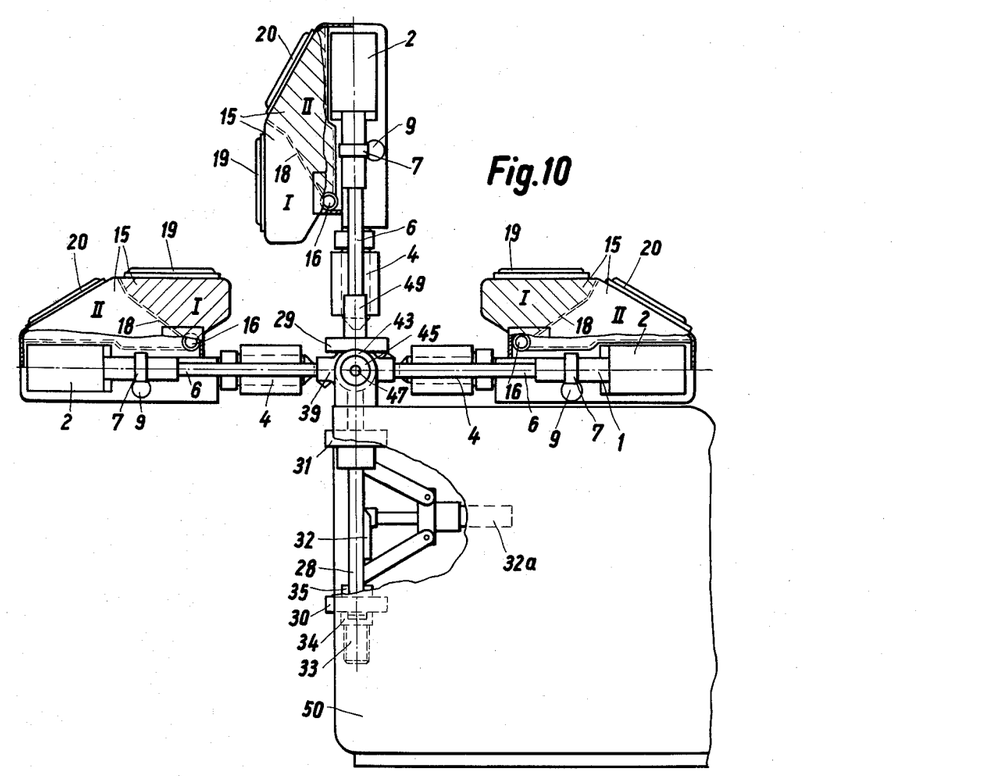
FIGURE 10 is a side elevational view showing the operative position of three injection casting assemblies when the mold clamping mechanism is in a vertical position.

FIGURES 4, 6, 10 and, in part, FIGURE 9, show the double receiving elements 38, 39, as being provided with abutment lugs 38', 38'', 38''', $38^{IV}$, and 39', 39'', 39''', $39^{IV}$, respectively. The lugs are adapted to receive set screws which serve to hold in place the support struts of additional injection casting assemblies. As best shown in FIGURES 6, the set screws in the lugs 39', 39'', 39''', $39^{IV}$, may engage appropriately shaped cut-outs in the struts 6. As best shown in FIGURES 6 (right side), 7, 9, and 10, the struts 5, 6, of an additional injection casting assembly are held in place in a receiving element 49 which is provided with lugs 49', 49''.

FIGURES 14 to 17 show a modified embodiment of a granulate receptacle which has but one granulate chamber, this receptacle being pivotally mounted on the injection casting assembly so as to enable the receptacle to assume a position in which the dosing mechanism is fully operative, irrespective of the orientation of the injection casting assembly. Thus, the receptacle 64, having a cover 65, is pivotally and steplessly mounted for rotation about the axis of the dosing channel 16. The dosing tube 70 of the receptacle 64 has opposite ends in receiving bearings 68 and 69 which are mounted on the member 1. The granulate chamber 67 is in communication with the dosing channel 16 by way of the outlet opening 66, this dosing channel being, as explained above, in communication with the plasticizing cylinder 4 by way of the outlet channel 17. This channel 17 passes through the bearing 69 which is flanged onto the member 1 of the injection casting assembly.

A shaped nut 71' is provided for holding the receptacle 64 in any desired operative position. This nut 71' is threaded onto the end of the dosing tube 70 which passes through the bearing 68, so that upon tightening of the nut 71', the angular position of the receptacle 64 is frictionally held in place.

Figures 18, 19, 20:
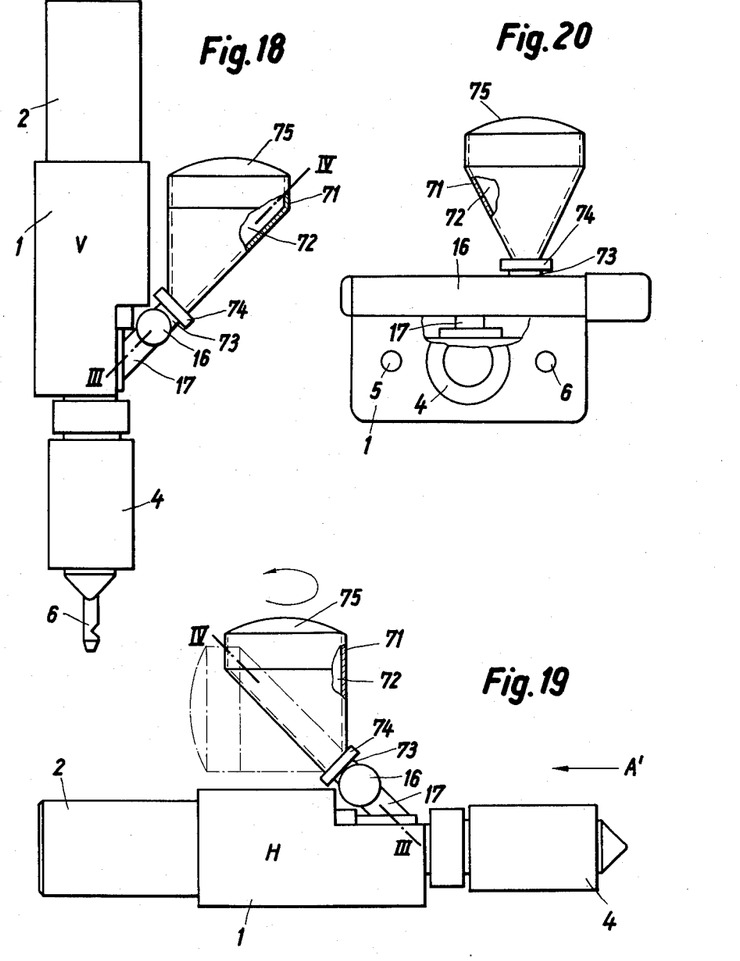
FIGURE 18 is yet another embodiment of a granulate storage receptacle which is pivotally mounted on the injection casting assembly.
FIGURE 19 shows the granulate storage receptacle of FIGURE 18 while attached to a horizontally oriented injection casting assembly.
FIGURE 20 is an end view of the arrangement shown in FIGURE 19, as seen in diraction of the arrow A'.

FIGURES 18 to 20 show another embodiment of a granulate storage receptacle having a dosing mechanism which is operative irrespective of the orientation of the injection casting assembly. The receptacle 71, having a cover 75, is asymmetrically constructed such that the volume of the single chamber 72 is predominantly concentrated on one side of the connecting axis III–IV. The receptacle 71 has a socket 74 which encompasses the flange of connecting stud 73 of the dosing channel 16, the arrangement being such that the receptacle 71 is rotatable about this flange on an axis which coincides with the above-mentioned axis III—IV. As a result, the receptacle may, irrespective of the orientation of the injection casting assembly, be rotated into a position in which the chamber 72 is brought above the level of the dosing channel 16 so that plastic granulate in the receptacle can flow into the dosing channel exclusively under the influence of gravity.

FIGURE 19 shows the preferable position of the receptacle 71 in solid lines, the position of the receptacle shown in phantom line being one in which the proper operation, i.e., the gravity feeding of the granulate, can no longer be relied on.

By virtue of the above-described arrangement, an injection molding machine according to the present invention allows the mold clamping mechanism and injection casting assembly or assemblies to be readily mounted in any desired position in a very simple manner. Furthermore, since the injection casting assembly may be placed either in axial alignment with the mold clamping mechanism or at right angles thereto, it is possible to introduce the plastic into a mold having its ingate in the parting plane of the two mold members or in but one of the two mold members held together by the clamping mechanism.

What is claimed is:

1. In an injection mold machine, the combination which comprises: a support; a mold clamping mechanism and at least one injection casting assembly provided with a material feeding means which is operative irrespective of the orientation of said injection casting assembly, said mold clamping mechanism and said injection casting assembly, each being an independent and self-contained device which has a generally longitudinal axis, said devices being positively and detachably connected to each other such that their longitudinal axes are either continuations of each other or that they intersect each other at right angles, as desired, the thus-connected devices together constituting a single rigid composite work unit; mounting means mounting said work unit on said support for rotation about a transverse axis which intersects the juncture of the longitudinal axes of said devices; and means for retaining said work unit in any desired position on said support.

2. The combination as defined in claim 1 wherein said mounting means comprise a pair of carrier elements and a pair of bolts arranged in said element, said bolts having transverse bores receiving, respectively, struts supporting said mold clamping mechanism; and wherein the ends of said struts carry receiving means adapted to receive struts supporting said injection casting assembly, the latter being arranged opposite said mold clamping mechanism.

3. The combination defined in claim 2 wherein the ends of said struts carry multiple receiving means adatped to receive struts of a plurality of injection casting assemblies.

4. The combination defined in claim 2 wherein said retaining means are friction means which comprise a pair of tightening screws threadedly engaging said bolts, respectively, each screw having a head engaging the corresponding carrier element, and clamping discs interposed between said screw heads and the corresponding carrier element; wherein the ends of said struts carry receiving means adapted to receive struts supporting said injection casting assembly; and wherein said friction means further comprise friction discs interposed between said carrier element and the corresponding receiving means.

5. The combination defined in claim 1 wherein said work unit includes a plurality of injection casting assemblies.

6. The combination defined in claim 1 wherein said material feeding means comprises means forming a dosing channel which is horizontal and extends at right angles to a plasticizing cylinder forming part of said injection casting assembly, said feeding device further comprising a granulate storage receptacle adapted to supply granulate by gravity feed irrespective of the orientation of said injection casting assembly.

7. The combination defined in claim 6 wherein said receptacle has a partition wall dividing the interior of said receptacle into two chambers each having an outlet opening, said dosing channel having an inlet opening and being rotatable such that said inlet opening may be placed in alignment with either of said outlet openings, as desired.

8. The combination defined in claim 6 wherein said receptacle has but a single interior chamber and is mounted on said injection casting assembly for pivotal movement about the axis of said dosing channel.

9. The combination defined in claim 8, further comprising friction means for holding said receptacle in any desired position.

10. The combination defined in claim 6 wherein said receptacle is mounted on said injection casting assembly for rotational movement relative thereto about a connecting axis, said receptacle being in communication with said dosing channel through a conduit extending along said connecting axis, said receptacle being asymmetrical and having but one interior chamber so arranged that said receptacle may be turned about said axis to insure a gravity feed of granulate into said connecting channel irrespective of the orientation of said injection casting assembly.

11. The combination defined in claim 10 wherein the asymmetric shape of said receptacle is such that a predominant portion of said chamber is located on one side of said axis.

12. The combination defined in claim 10 wherein said receptacle is provided with a socket encompassing a flange of a connecting stud, said socket and stud constituting a rotatable connection.

References Cited in the file of this patent

UNITED STATES PATENTS

| | | |
|---|---|---|
| 2,226,408 | Nast | Dec. 24, 1940 |
| 2,358,956 | Ashbaugh | Sept. 26, 1944 |
| 2,438,856 | Knowles | Mar. 30, 1948 |
| 2,461,282 | Jobst | Feb. 8, 1949 |
| 2,498,264 | Goldhard | Feb. 21, 1950 |
| 2,649,621 | Moslo | Aug. 25, 1953 |
| 2,711,567 | Knapp | June 28, 1955 |
| 2,799,047 | Widiger et al. | July 16, 1957 |

FOREIGN PATENTS

| | | |
|---|---|---|
| 537,126 | Canada | Feb. 12, 1957 |
| 736,662 | Great Britain | Sept. 14, 1955 |

OTHER REFERENCES

The Rubber Age, article vol. 56, No. 3, December 1944, pages 277–286.